United States Patent
Hart et al.

(10) Patent No.: US 8,033,946 B2
(45) Date of Patent: Oct. 11, 2011

(54) MULTI-SPEED TRANSMISSION

(75) Inventors: James M. Hart, Belleville, MI (US);
Andrew W. Phillips, Saline, MI (US);
Clinton E. Carey, Monroe, MI (US);
Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 755 days.

(21) Appl. No.: 12/116,681

(22) Filed: May 7, 2008

(65) Prior Publication Data

US 2008/0305913 A1    Dec. 11, 2008

Related U.S. Application Data

(60) Provisional application No. 60/942,744, filed on Jun. 8, 2007.

(51) Int. Cl.
*F16H 3/62* (2006.01)
(52) U.S. Cl. ...................................................... 475/275
(58) Field of Classification Search .......... 475/275–293, 475/303, 311–313, 317–319, 323–325
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,634,980 B1 * | 10/2003 | Ziemer | 475/275 |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,226,381 B2 * | 6/2007 | Klemen | 475/275 |
| 7,311,635 B2 * | 12/2007 | Klemen | 475/286 |
| 7,628,724 B2 * | 12/2009 | Hart et al. | 475/275 |
| 7,674,200 B2 * | 3/2010 | Shim | 475/281 |
| 7,731,620 B2 * | 6/2010 | Hukill et al. | 475/275 |
| 7,749,125 B2 * | 7/2010 | Hart et al. | 475/275 |
| 7,749,127 B2 * | 7/2010 | Hart et al. | 475/276 |
| 2005/0090362 A1 | 4/2005 | Abe et al. | |
| 2006/0270513 A1 | 11/2006 | Klemen | |
| 2006/0270516 A1 | 11/2006 | Klemen | |

* cited by examiner

*Primary Examiner* — Tisha Lewis

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices are clutches.

15 Claims, 2 Drawing Sheets

| GEAR STATE | GEAR RATIO | RATIO STEP | TORQUE TRANSMITTING ELEMENTS | | | | |
|---|---|---|---|---|---|---|---|
| | | | 34 | 26 | 28 | 32 | 30 |
| REV | -3.200 | | | | X | | X |
| N | | -0.63 | | | O | | |
| 1st | 5.110 | | | | X | X | |
| 2nd | 3.367 | 1.52 | X | | X | | |
| 3rd | 2.418 | 1.39 | X | | | X | |
| 4th | 1.517 | 1.59 | X | | | | X |
| 5th | 1.272 | 1.19 | X | X | | | |
| 6th | 1.000 | 1.27 | | X | | | X |
| 7th | 0.901 | 1.11 | | X | | X | |
| 8th | 0.733 | 1.23 | | | | X | X |

X = ON, CARRYING TORQUE
O = ON, NOT CARRYING TORQUE

MULTI-SPEED TRANSMISSION

CROSS-REFERENCE TO RELATED APPLICATIONS

This application claims the benefit of U.S. Provisional Application Ser. No. 60/942,744 filed on Jun. 8, 2007. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

In an aspect of the present invention, a transmission is provided having an input member, an output member, four planetary gear sets, a plurality of interconnecting members and a plurality of torque transmitting devices. Each of the planetary gear sets includes first, second and third members. The first interconnecting member continuously interconnects the first member of the first planetary gear set with a stationary member. The second interconnecting member continuously interconnects the first member of the first planetary gear set with the second member of the second planetary gear set. The third interconnecting member continuously interconnects the third member of the second planetary gear set with at least one of the second member of the third planetary gear set and the input member. The fourth interconnecting member continuously interconnects the first member of the second planetary gear set with the first member of the third planetary gear set. The fifth interconnecting member continuously interconnects the third member of the third planetary gear set with the third member of the fourth planetary gear set. The five torque transmitting devices are selectively engageable to interconnect one of the first, second, and third members with at least one other of the first members, second members, third members, and the stationary member. The torque transmitting devices are selectively engageable in combinations of at least two to establish at least eight forward speed ratios and at least one reverse speed ratio between the input member and the output member.

In another aspect of the present invention, the first of the five torque transmitting devices is selectively engageable to interconnect the third member of the first planetary gear set with the second member of the third planetary gear set.

In still another aspect of the present invention, the second of the five torque transmitting devices is selectively engageable to interconnect the third member of the first planetary gear set with at least one of the first member of the second planetary gear set and the first member of the third planetary gear set.

In still another aspect of the present invention, the third of the five torque transmitting devices is selectively engageable to interconnect the third member of the first planetary gear set with the second member of the fourth planetary gear set.

In still another aspect of the present invention, the fourth of the five torque transmitting devices is selectively engageable to interconnect the third member of the first planetary gear set with the first member of the fourth planetary gear set.

In still another aspect of the present invention, the fifth of the five torque transmitting devices is selectively engageable to interconnect the second member of the first planetary gear set with the first member of the fourth planetary gear set.

In still another aspect of the present invention, the first member of the first planetary gear set, the third member of the second planetary gear set, the first member of the third planetary gear set and third member of the fourth planetary gear set are sun gears, the second member of the second, third and fourth planetary gear sets and the third member of the first planetary gear set are carrier members and the second member of the first planetary gear set, first member of the second planetary gear set, the third member of the third planetary gear set and the first member of the fourth planetary gear set are ring gears.

In still another aspect of the present invention, the input member is continuously interconnected with at least one of the third member of the second planetary gear set and the second member of the third planetary gear set and wherein the output member is continuously interconnected with the second member of the fourth planetary gear set.

In yet another aspect of the present invention, the five of the torque transmitting devices are clutches.

In yet another aspect of the present invention, the stationary member is a transmission housing.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting clutches in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. A first component or element of a first planetary gear set is permanently coupled to ground or a transmission housing. A second component or element of the second planetary gear set is permanently coupled to ground or a transmission housing. A third component or element of the second planetary gear set is permanently coupled to a second component or element of the third planetary gear set. A first component or element of a second planetary gear set is permanently coupled to a first component or element of a third planetary gear set. Finally, a third component or element of the third planetary gear set is permanently coupled to a third component or element of a fourth planetary gear set.

Figure 1:
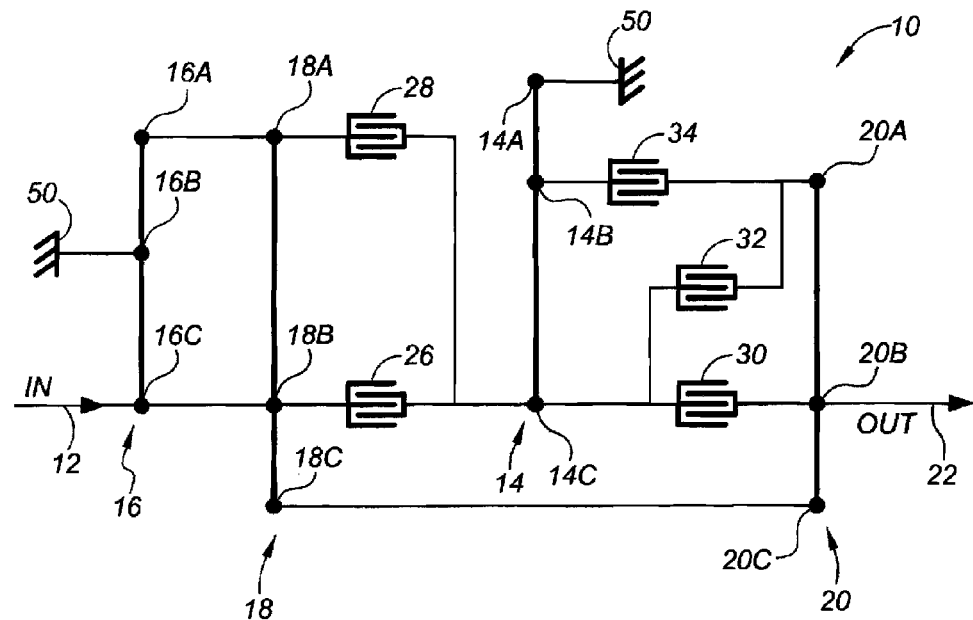
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the third node 16C of the second planetary gear set 16. The output member 22 is coupled to the second node 20B of the fourth planetary gear set 20. The first node 14A of the first planetary gear set 14 is coupled to a ground or transmission housing 50. The first node 16A of the second planetary gear set 16 is coupled to the first node 18A of the third planetary gear set 18. The second node 16B of the second planetary gear set 16 is coupled to a ground or transmission housing 50. The third node 16C of the second planetary gear set 16 is coupled to the second node 18B of the third planetary gear set 18. The third node 18C of the third planetary gear set 18 is coupled to the third node 20C of the fourth planetary gear set 20.

A first clutch 26 selectively connects the third node 14C of the first planetary gear set 14 to the second node 18B of the third planetary gear set 18. A second clutch 28 selectively connects third node 14C of the first planetary gear set 14 to the first node 18A of the third planetary gear set 18. A third clutch 30 selectively connects third node 14C of the first planetary gear set 14 to the second node 20B of the fourth planetary gear set 20. A fourth clutch 32 selectively connects the third node 14C of the first planetary gear set 14 to the first node 20A of the fourth planetary gear set 20. A fifth clutch 34 selectively connects the second node 14B of the first planetary gear set 14 to the first node 20A of the fourth planetary gear set 20.

Figure 2:
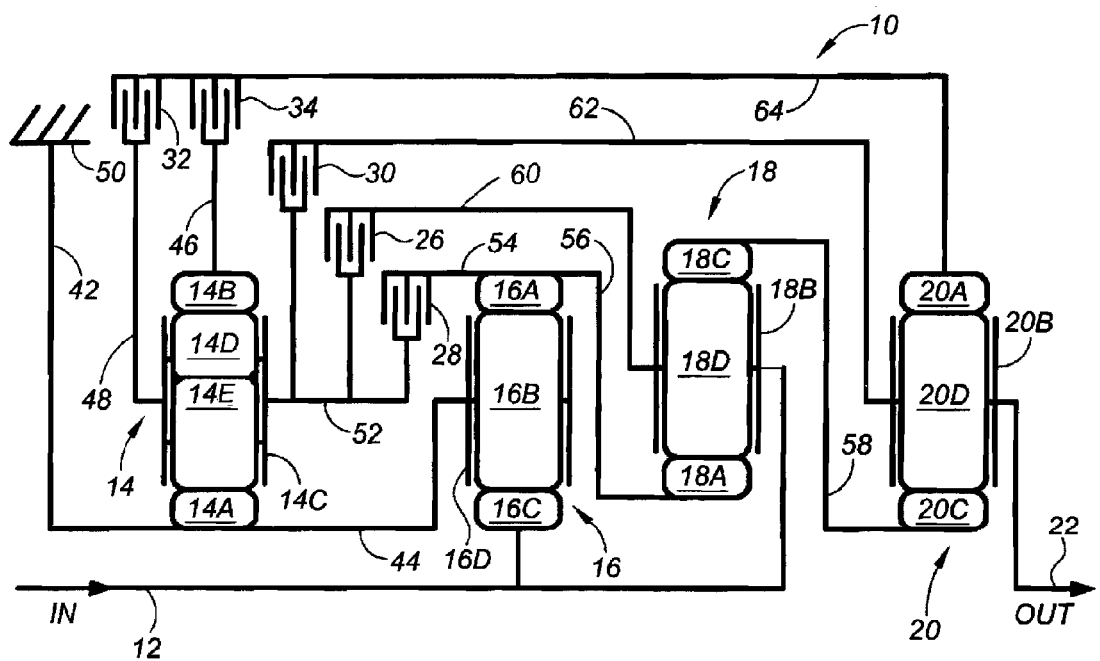
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 is a planetary gear set that includes a sun gear member 14A, a planet gear carrier member 14C supports a first set of planet gears 14D and a second set of planet gears 14E and a ring gear member 14B. The sun gear member 14A is connected to ground or transmission housing 50 through a first shaft or interconnecting member 42 and to a second shaft or interconnecting member 44. The ring gear member 14B is connected for common rotation to a third shaft or interconnecting member 46. The planet gear carrier member 14C is connected for common rotation with a fourth shaft or interconnecting member 48 and a fifth shaft or interconnecting member 52. The first set of planet gears 14D are each configured to intermesh with both the ring gear member 14B and the second set of planet gears 14E. The second set of planet gears 14E are each configured to intermesh with both the sun gear member 14A and the first set of planet gears 14D.

The input shaft or member 12 is continuously connected to an engine (not shown) or to a turbine of a torque converter (not shown). The output shaft or member 22 is continuously connected with the final drive unit or transfer case (not shown).

The planetary gear set 16 is a planetary gear set that includes a sun gear member 16C, a ring gear member 16A and a planet carrier member 16B that rotatably supports a set of planet gears 16D. The sun gear member 16C is connected for common rotation with input shaft or member 12. The ring gear member 16A is connected for common rotation with a sixth shaft or interconnecting member 54 and a seventh shaft or interconnecting member 56. The planet carrier member 16B is connected for common rotation with second shaft or interconnecting member 44. Each of the planet gears 16D are configured to intermesh with both sun gear member 16C and ring gear member 16A.

The planetary gear set 18 is a planetary gear set that includes a sun gear member 18A, a ring gear member 18C and a planet carrier member 18B that rotatably supports a set of planet gears 18D. The sun gear member 18A is connected for common rotation with the seventh shaft or interconnecting member 56. The ring gear member 18C is connected for common rotation with the eighth shaft or interconnecting member 58. The planet carrier member 18B is connected for common rotation with input shaft or member 12 and to a ninth shaft or interconnecting member 60. Each of the planet gears 18D are configured to intermesh with both the sun gear member 18A and the ring gear member 18C.

The planetary gear set 20 is a planetary gear set that includes a sun gear member 20C, a planet carrier member 20B that rotatably supports a set of planet gears 20D, and a ring gear member 20A. The sun gear member 20C is connected for common rotation with eighth shaft or interconnecting member 58. The planet carrier member 20B is connected for common rotation with a tenth shaft or interconnecting member 62 and output shaft or member 22. The ring gear member 20A is connected for common rotation with an eleventh shaft or interconnecting member 64. Each of the planet gears 20D are configured to intermesh with both the ring gear member 20A and sun gear member 20C.

The torque-transmitting mechanisms or clutches 26, 28, 30, 32 and 34 allow for selective interconnection of the shafts or interconnecting members, members of the planetary gear sets and the housing. For example, the first clutch 26 is selectively engageable to connect the fifth shaft or interconnecting member 52 to the ninth shaft or interconnecting member 60. The second clutch 28 is selectively engageable to connect the fifth shaft or interconnecting member 52 to sixth shaft or interconnecting member 54. The third clutch 30 is selectively engageable to connect the fifth shaft or interconnecting member 52 to tenth shaft or interconnecting member 62. The fourth clutch 32 is selectively engageable to connect the fourth shaft or interconnecting member 48 to eleventh shaft or interconnecting member 64. The fifth clutch 34 is selectively engageable to connect third shaft or interconnecting member 46 to eleventh shaft or interconnecting member 64.

Referring now to FIGS. 2 and 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, fourth clutch 32, and fifth clutch 34), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the second clutch 28 and the third clutch 30 are engaged or activated. The second clutch 28 connects the fifth shaft or interconnecting member 52 to sixth shaft or interconnecting member 54. The third clutch 30 connects the fifth shaft or interconnecting member 52 to tenth shaft or interconnecting member 62. Likewise, the eight forward ratios are achieved through different combinations of clutch engagement, as shown in FIG. 3.

It will be appreciated that the foregoing explanation of operation and gear states of the eight speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first interconnecting member continuously interconnecting the first member of the first planetary gear set with a stationary member;
   a second interconnecting member continuously interconnecting the first member of the first planetary gear set with the second member of the second planetary gear set;
   a third interconnecting member continuously interconnecting the third member of the second planetary gear set with at least one of the second member of the third planetary gear set and the input member;
   a fourth interconnecting member continuously interconnecting the first member of the second planetary gear set with the first member of the third planetary gear set;
   a fifth interconnecting member continuously interconnecting the third member of the third planetary gear set with the third member of the fourth planetary gear set; and
   five torque transmitting devices each selectively engageable to interconnect at least one of the first, second, and third members with at least one other of the first members, second members, third members, and the stationary member, and
   wherein the torque transmitting devices are selectively engageable in combinations of at least two to establish at least eight forward speed ratios and at least one reverse speed ratio between the input member and the output member.

2. The transmission of claim 1 wherein a first of the five torque transmitting devices is selectively engageable to interconnect the third member of the first planetary gear set with the second member of the third planetary gear set.

3. The transmission of claim 2 wherein a second of the five torque transmitting devices is selectively engageable to interconnect the third member of the first planetary gear set with at least one of the first member of the second planetary gear set and the first member of the third planetary gear set.

4. The transmission of claim 3 wherein a third of the five torque transmitting devices is selectively engageable to interconnect the third member of the first planetary gear set with the second member of the fourth planetary gear set.

5. The transmission of claim 4 wherein a fourth of the five torque transmitting devices is selectively engageable to interconnect the third member of the first planetary gear set with the first member of the fourth planetary gear set.

6. The transmission of claim 5 wherein a fifth of the five torque transmitting devices is selectively engageable to interconnect the second member of the first planetary gear set with the first member of the fourth planetary gear set.

7. The transmission of claim 1 wherein the first member of the first planetary gear set, the third member of the second planetary gear set, the first member of the third planetary gear set and third member of the fourth planetary gear set are sun gears, the second member of the second, third and fourth planetary gear sets and the third member of the first planetary gear set are carrier members and the second member of the first planetary gear set, first member of the second planetary gear set, the third member of the third planetary gear set and the first member of the fourth planetary gear set are ring gears.

8. The transmission of claim 1 wherein the input member is continuously interconnected with at least one of the third member of the second planetary gear set and the second member of the third planetary gear set and wherein the output member is continuously interconnected with the second member of the fourth planetary gear set.

9. The transmission of claim 1 wherein five of the torque transmitting devices are clutches.

10. The transmission of claim 1 wherein the stationary member is a transmission housing.

11. A transmission comprising:
an input member;
an output member;
first, second, third and fourth planetary gear sets each having first, second and third members, wherein the input member is continuously interconnected with at least one of the third member of the second planetary gear set and the second member of the third planetary gear set and wherein the output member is continuously interconnected with the second member of the fourth planetary gear set;
a first interconnecting member continuously interconnecting the first member of the first planetary gear set with a stationary member;
a second interconnecting member continuously interconnecting the first member of the first planetary gear set with the second member of the second planetary gear set;
a third interconnecting member continuously interconnecting the third member of the second planetary gear set with at least one of the second member of the third planetary gear set and the input member;
a fourth interconnecting member continuously interconnecting the first member of the second planetary gear set with the first member of the third planetary gear set;
a fifth interconnecting member continuously interconnecting the third member of the third planetary gear set with the third member of the fourth planetary gear set; and
a first torque transmitting device selectively engageable to interconnect the third member of the first planetary gear set with the second member of the third planetary gear set;
a second torque transmitting device selectively engageable to interconnect the third member of the first planetary gear set with at least the first member of the second planetary gear set and the first member of the third planetary gear set;
a third torque transmitting device selectively engageable to interconnect the third member of the first planetary gear set with the second member of the fourth planetary gear set;
a fourth torque transmitting device selectively engageable to interconnect the third member of the first planetary gear set with the first member of the fourth planetary gear set; and
a fifth torque transmitting device selectively engageable to interconnect the second member of the first planetary gear set with the first member of the fourth planetary gear set, and
wherein the torque transmitting devices are selectively engageable in combinations of at least two to establish at least eight forward speed ratios and at least one reverse speed ratio between the input member and the output member.

12. The transmission of claim 11 wherein the first member of the first planetary gear set, the third member of the second planetary gear set, the first member of the third planetary gear set and third member of the fourth planetary gear set are sun gears, the second member of the second, third and fourth planetary gear sets and the third member of the first planetary gear set are carrier members and the second member of the first planetary gear set, first member of the second planetary gear set, the third member of the third planetary gear set and the first member of the fourth planetary gear set are ring gears.

13. The transmission of claim 11 wherein the stationary member is a transmission housing.

14. A transmission comprising:
an input member;
an output member;
first, second, third and fourth planetary gear sets each having a sun gear, a carrier member, and a ring gear, wherein the input member is continuously interconnected with at least one of the sun gear of the second planetary gear set and the carrier member of the third planetary gear set and wherein the output member is continuously interconnected with the carrier member of the fourth planetary gear set;
a first interconnecting member continuously interconnecting the sun gear of the first planetary gear set with a stationary member;
a second interconnecting member continuously interconnecting the sun gear of the first planetary gear set with the carrier member of the second planetary gear set;
a third interconnecting member continuously interconnecting the sun gear of the second planetary gear set with at least one of the carrier member of the third planetary gear set and the input member;
a fourth interconnecting member continuously interconnecting the ring gear of the second planetary gear set with the sun gear of the third planetary gear set;
a fifth interconnecting member continuously interconnecting the ring gear of the third planetary gear set with the sun gear of the fourth planetary gear set; and
a first torque transmitting device selectively engageable to interconnect the carrier member of the first planetary gear set with the carrier member of the third planetary gear set;
a second torque transmitting device selectively engageable to interconnect the carrier member of the first planetary gear set with at least the ring gear of the second planetary gear set and the sun gear of the third planetary gear set;
a third torque transmitting device selectively engageable to interconnect the carrier member of the first planetary gear set with the carrier member of the fourth planetary gear set;
a fourth torque transmitting device selectively engageable to interconnect the carrier member of the first planetary gear set with the ring gear of the fourth planetary gear set; and
a fifth torque transmitting device selectively engageable to interconnect the ring gear of the first planetary gear set with the ring gear of the fourth planetary gear set, and
wherein the torque transmitting devices are selectively engageable in combinations of at least two to establish at least eight forward speed ratios and at least one reverse speed ratio between the input member and the output member.

15. The transmission of claim 14 wherein the stationary member is a transmission housing.

* * * * *